United States Patent [19]

Hagens et al.

[11] Patent Number: 6,056,816
[45] Date of Patent: May 2, 2000

[54] ADHESIVE COMPOSITIONS FOR CORRUGATED BOXES

[76] Inventors: Rodger Graham Hagens, 12 Kenmore Road, Hamilton, Ontario, Canada, L8S 3T7; Michael McDonald, 137 Dowling Avenue, Toronto, Ontario, Canada, M6K 3A9; William Millard, 26 Maple Avenue South, Mississauga, Ontario, Canada, L5H 2R6

[21] Appl. No.: 09/071,880

[22] Filed: May 4, 1998

Related U.S. Application Data

[60] Provisional application No. 60/045,821, May 5, 1997.

[51] Int. Cl.[7] .................................................. C09J 103/02
[52] U.S. Cl. ..................... 106/617; 106/206.1; 127/29; 127/32; 127/71
[58] Field of Search ..................................... 106/600, 617, 106/206.1; 127/29, 32, 71; 536/45, 124

[56] References Cited

U.S. PATENT DOCUMENTS

| | | |
|---|---|---|
| 2,669,282 | 2/1954 | Kreyling . |
| 2,772,996 | 12/1956 | Sams . |
| 5,194,091 | 3/1993 | Laney ........................................ 106/611 |
| 5,571,316 | 11/1996 | Gill .......................................... 106/617 |
| 5,776,242 | 7/1998 | Gill et al. .................................. 106/617 |

FOREIGN PATENT DOCUMENTS

| | | |
|---|---|---|
| 1056107 | 6/1979 | Canada . |
| 1122817 | 5/1996 | China . |

*Primary Examiner*—Paul Marcantoni
*Attorney, Agent, or Firm*—Ridout & Maybee

[57] ABSTRACT

Novel starch-silicate adhesive compositions are disclosed which are of particular advantage in the manufacture of corrugated board. By the controlled combination of starch, alkali silicate and, optionally, caustic soda and borax it has been found possible to produce useable adhesives having much higher levels of solids content than conventional starch-based adhesives, thereby allowing for lowered energy costs in use of the adhesive formulation to manufacture boxboard, as well as improved product quality. The formulation of starch-silicate adhesives according to the invention allows viscosity, rheological characteristics—in particular gelation temperature—and the speed of "green-bond" formation to be controlled and adapted to the requirements of modern high-speed corrugating equipment.

14 Claims, No Drawings

ADHESIVE COMPOSITIONS FOR CORRUGATED BOXES

RELATED APPLICATION

This application replaces Provisional Application Ser. No. 60/045,821 filed on May 05, 1997 and entitled "Adhesive Compositions for Corrugated Boxes".

BACKGROUND OF THE INVENTION

This invention relates to the manufacture of novel starch-silicate adhesive compositions. In particular this invention concerns the formulation of adhesives for the manufacture of corrugated board by the use of improved mixtures of starches and alkali metal silicates.

The art of using soluble alkali silicates as adhesives for paper and box board has been known for many years. Alkali silicates are inexpensive, fire resistant, vermin resistant, recyclable and provide excellent strength to the products in which they are used. Among other applications these compounds find use as adhesives for paper products and plywood, as well as paper cores and tubes. Alkali silicates do however have a number of disadvantages which have resulted in the discontinuation of their use in certain industrial applications.

A primary disadvantage of silicate based adhesives is that the adhesive bond forms relatively slowly. This is a serious problem in the high speed corrugating machines employed today which require the formation of a strong "green bond" within a very few seconds of the linerboard and the corrugating medium being brought into contact. Another disadvantage of alkali silicates is that they are prone to deposit a tough, intractable glass on any surfaces upon which they are allowed to dry.

Because starch exhibits performance properties which are superior in quick bond formation and does not form a tough deposit, starch has almost completely replaced alkali silicates in the manufacture of corrugated boxboard some years ago. Starch itself, however, is not a perfect adhesive for this application. For one thing, the maximum solids content of such adhesive compositions usually attainable is in the range of 25–30%. Thus some 75% of the adhesive formulation applied to the boxboard consists of water, the removal of which reduces the operational speed of the corrugating equipment, and increases the energy costs associated with water evaporation. The higher water content of the adhesive also contributes to loss of paper strength as well as quality problems during the manufacture of boxes such as warping, blistering or a "washboard" effect.

It has also long been known that the edge crush strength of boxes glued with starch based adhesives is not as high as that which can be attained by use of silicate. These strength properties are now of considerable importance, owing to the fact that the specification of boxes is now based on their edge crush strength (Alternate Freight Regulations Rule 41, as described in Tappi test methods T811) rather than basis weight (as was the case in the past). Use of silicates in the adhesive thus opens the possibility of manufacturing boxes of equivalent edge crush strength either by using paper of a lower basis weight or by using recycled paper of poor quality.

A number of attempts have been made to combine alkali silicates and starch in adhesives for the fabrication of corrugated paperboard boxes and similar applications, in order to realize the benefits described. Thus U.S. Pat. No. 2,669,282 (Kreyling) discloses an adhesive mixture of starch, clay and sodium silicate. U.S. Pat. No. 2,772,996 (Sams) teaches a method of producing such an adhesive by mixing silicate, starch and borax. More recently, Canadian Patent No. 1,056,107 (Falcone, 1979) discloses a class of starch-silicate adhesives in which some of the starch in conventional starch-based adhesive compositions is replaced by alkali silicate, but the total solids content of the adhesive compositions is not appreciably changed.

To date, however, none of the compositions or methods to combine starch and silicate for the manufacture of corrugated boxboard has found commercial application because none has proved to be capable of meeting the demanding requirements of modern high speed corrugating equipment, none of the previous starch and silicate combinations having demonstrated the ability to impart higher edge crush. The principal requisites for such performance features are, firstly, formulation of adhesives so that their viscosity, rheology properties, gelation temperature and speed of "green-bond" formation are all within a very tight range. It is thus essential that the finished adhesive have low thixotropy and a viscosity of between 20–60 Stein-Hall seconds in order to achieve a smooth and rapid transfer of the adhesive from the holding tanks to the corrugator adhesive applicator stations.

A second essential aspect of starch based adhesive formulations is the temperature at which gelation of starch occurs. This usually occurs at a temperature between 60 and 70° C. (140–160° F.), operation of modern corrugating equipment not generally being possible if the gelation temperature is outside this range. Although the aforementioned Falcone patent reveals that addition of sodium silicate to starch leads to a dramatic increase in gel temperature, no teaching has yet been provided of how to formulate satisfactory starch/silicate compositions having gel temperatures low enough to be within an allowable operating range or a viscosity stability over time at elevated temperature, i.e. above 50° F. (120° F.).

There is yet another aspect of starch gelation of pertinence to this invention. During the normal operating procedure the starch based adhesive is maintained in the storage tank at a temperature of between 38–40° C. (100–104° F.). The stability of conventional starch based adhesives is such that this material is prone to premature gelation due to fluctuations in the temperature of the operating environment, and these starch based adhesives can not be stored longer than about 3 days.

We have discovered that by modifying starch-based adhesives by the addition of alkali silicate, in addition to other ingredients such as caustic soda and borax commonly used in starch adhesives, in a precisely controlled and ordered manner, that it is possible to realize all the known advantages of alkali silicates without incurring the problems with viscosity or elevated gelation temperatures which prevented the commercialization of the earlier disclosures.

These formulations are also found to exhibit unusually good high temperature stability. The discovery of high temperature stability has allowed for higher temperature storage which has help offset the higher gel temperature.

Moreover we also discovered, to our surprise, that the methods here described allow the preparation of starch based adhesives with very much higher solids content than previously attainable. As will be demonstrated in the examples below, this discovery increases the solids content of such compositions from the 25–30% range achievable using the conventional technology, to around 45% solids. As mentioned above, reduction of the water content in this manner leads to significant benefits in the operation of corrugating equipment by reducing the strength loss in the liner and mediums caused by water addition from the adhesive, the amount of steam energy required to evaporate the water and the production of boxes with improved dimensional stability.

As the examples given below will show, the invention herein described also lead to improvements both in the strength of the adhesive bond, and in the box itself. The examples also demonstrate that these formulations are entirely compatible with a wide range of operational variables commonly encountered and well known to those skilled in the art.

Formulations according to the present invention are: (i) applicable to raw and modified starches from a wide variety of sources; (ii) compatible with insolubilizing resins such as the cross-linked polymers of melamine-formaldehyde, urea-formaldehyde and ketone-aldehyde commonly used to impart water resistance to starch based adhesives; and (iii) amenable to preparation using conventional techniques for preparing starch-based adhesives, such as the "two-stage" (Example 8, below), "no carrier" (Example 9, below), and "carrier-no carrier" manufacturing processes.

Although most of the examples presented reveal the preparation of the adhesives using liquid ingredients, Example 10 is also presented to demonstrate that similar results can be obtained if only dry ingredients are employed, this being of potential advantage in the commercialization of these materials.

Example 11 below is presented to demonstrate that when these formulations are prepared using recycled water from the corrugating print station (so-called "flexo" water), the concentration of soluble copper in the adhesive is reduced to an unexpectedly low level. The importance of this observation arises from the fact that although the use of flexo water in the preparation of starch based adhesives is an increasingly popular method of recycling waste streams, the conventional starch based compositions employed until now have not been found capable of reducing the solubility of toxic copper ions or other metal ions present in the waste water. The specific reduction of copper observed in the compositions here disclosed is to be attributed to the well known sequestering properties of alkaline silicates.

Although the focus of this disclosure is directed towards manufacture of corrugated boxes, it should also be noted that this is but one of numerous area of potential application of the silicate-starch compositions herein described. Adhesives according to the invention may be used with other cellulosic materials, such as wood and other paper products.

SUMMARY OF THE INVENTION

With a view to providing improved adhesives for the manufacture of boxes and other industrial wood and paper products, based on combinations of silicate and starch but affording the requisite control of adhesive viscosity and gel temperature to permit use of the adhesives in corrugating equipment, the invention is directed in one aspect to adhesive compositions having solids content of 30 to 45% by weight and consisting essentially of:
(i) 12 to 35% by weight of a starch;
(ii) 1.5 to 12% of soluble alkali metal silicate;
(iii) 0.25 to 2.5% by weight of alkali hydroxide;
(iv) optionally, up to 2% borax (anhydrous or hydrated form) or boric acid; and
(v) 55 to 70% water by weight, and in another aspect, to processes for preparing improved starch-silicate adhesives of this kind.

In the present invention, "starch" refers to the carbohydrate reserve of a plant. It is generally deposited in the form of minute granules 1 to 100 microns and swells in water at 55 to 80° C. While starches are found throughout the plant world, those of particular commercial advantage for use in the present invention are corn, wheat and potato starches, although others could be used, including modified starches. An example of a preferred starch is the cornstarch sold as 3005 by Corn Products International, Ill.

Soluble alkaline silicates useful in carrying out the present invention include materials in solution as well as hydrated solids and anhydrous silicates, exhibiting molar ratios of $SiO_2$ to $M_2O$ in the range of 1.5 to 4.0 where M is preferably either sodium or potassium. The disclosure of Canadian Patent No. 1,056,107 is hereby incorporated by reference for its general teaching of alkali metal silicates used in starch-silicate adhesive compositions. A particular silicate found useful in the present invention is N® brand sodium silicate manufactured by the PQ Corporation (valley Forge, Pa.), which exhibits a weight ratio of $SiO_2$ to $Na_2O$ of 3.2.

DETAILED DESCRIPTION OF THE INVENTION

Compositions according to the present invention are illustrated in Examples 2 and 3 in which modified and unmodified carrier starches respectively are employed to prepare adhesive compositions according to the invention, which exhibit superior bond and paper strength when used in the manufacture of corrugated boxes.

There is provided a demonstration of the superior heat stability of this composition (Example 4), and a method of varying the gelation characteristics including gel temperature of the starch-silicate adhesives of the invention by changing the relative quantities of caustic soda and borax used in their preparation (Example 5), this being of particular importance to ensure that the gelation characteristics are compatible with the operation of modern corrugating equipment.

The prior art relating to starch-silicate adhesive combinations is limited to total solids content in the range of 15 to 30%, a limit dictated by the high viscosity, instability and gel temperature which were observed in the formulations contained within these earlier disclosures. According to a further advantage afforded by the present invention, however, a silicate-starch adhesive may be manufactured at a solids content as high as 45%. (Example 6). This grants a number of significant advantages including:
  (i) realization of energy savings as a result of a reduction of the amount of water requiring evaporation;
  (ii) lower warpage of glued boxboard product, again because of lower initial water content;
  (iii) faster machine speeds; and
  (iv) less liner and medium strength loss due to water from the adhesive.

A currently preferred embodiment of the process of the invention, comprises the following steps for preparing new and useful starch silicate adhesives:
  (a) preparing a gelled carrier portion by addition of 1.5 to 10% starch by weight of the final adhesive composition to 20 to 45% by weight of water, mixing until the starch is dispersed in the water, and then adding of 0.25 to 2.5% by weight of sodium or potassium hydroxide, after which the composition is mixed or preferably sheared, until a complete gel and constant viscosity of this carrier portion is obtained;
  (b) adding 10 to 30% by weight of liquid sodium or potassium silicate to the carrier portion and shear mixing until homogeneous;

(c) optionally, adding to the mixture produced in step (b) up to 2.5% by weight of sodium or potassium hydroxide, after which the material is mixed or sheared until homogenous;

(d) optionally, adding up to 2% by weight of borax followed by mixing or shearing to constant viscosity;

(e) adding of 3 to 20% by weight of water and mixing or shearing until homogenous; and (f) adding 2 to 35% starch by weight and shear mixing to constant viscosity to produce the final adhesive composition.

As will also be shown in the examples which follow, these compositions are also compatible with various other chemicals and industrial processes well known to those skilled in the art of adhesive manufacture, such as insolubilizing resins (Example 7); the "two-stage" addition process (Example 8) and "no-carrier" methods well known to those skilled in the art (Example 9).

According to a further aspect of this invention, silicate-starch adhesives of this type can be prepared as a pre-mixed dry blend by the use of a dry form of alkali silicate (Example 10). Finally, a still further aspect of this invention illustrated in Example 11, reveals that use of recycled "flexo" water results in a composition containing significantly lower levels of soluble copper.

Those skilled in the art will also be aware that the formulating procedures herein described also apply to other types of starches (such as acid-stable starches) as are commonly used in adhesive compositions. Nor are these examples meant to preclude the use of other common additives such as surfactants, or polymers such as polyvinyl alcohol which are used from time to time to enhance the performance of such adhesives.

EXPERIMENTAL EXAMPLES

In the following examples, certain embodiments of the invention are illustrated and compared to the prior art. All proportions used in the examples are parts by weight (pbw) unless otherwise noted. The ratios of the silicates are weight ratios of $SiO_2/Na_2O$, sodium generally being the alkali metal of choice.

The first example shown illustrates the preparation of a typical starch based adhesive commonly used in industrial applications, the method of preparation of this standard composition which will be used as a control is as follows:

Example 1

Preparation of conventional starch based adhesive for use in the manufacture of corrugated boxes.

The carrier portion of a pure starch adhesive is prepared by combining 39.2 pbw water with 5.2 pbw modified corn starch (manufactured by Corn Products International under the name Surebond®) followed by 1.1 pbw sodium hydroxide (50% solution). The resulting slurry is held at 45° C. (115° F.) and is allowed to gel while mixing under high shear. Upon reaching a stable viscosity, 0.39 pbw of borax (pentahydrate) is added to gel mixture and mixed to a stable viscosity. 31.41 pbw water is added to the mixture and mixed until homogeneous. 22.7 pbw prime (unmodified) corn starch (Corn Products International, 3005) is added to the mixture and mixed until homogeneous.

Initial Stein-Hall Viscosity—25–35 seconds at 38° C. (100° F.)

gel temperature—61° C. (142° F.)

Example 2

An adhesive composition prepared under commercial conditions using a modified carrier starch. The adhesive composition demonstrates superior bond strength and edge crush strength of corrugated board made with starch/silicate.

The carrier portion of the starch/silicate adhesive is prepared by combining 36.1 pbw water with 4.9 pbw modified corn starch (Corn Products International, Surebond®) followed by 1.0 pbw caustic (50%). The resulting slurry was held at 55° C. (131° F.) and is allowed to gel under low shear mixing. Upon reaching a stable viscosity, 18.9 pbw sodium silicate (Silicate N®, PQ Corporation) is added and mixed until homogenous. 1.4 pbw caustic (50%) is added to the mixture and mixed until homogeneous. 0.37 pbw borax (pentahydrate) is added to the mixture and mixed to a stable viscosity. 15.7 pbw water is added and mixed until homogeneous. 21.6 pbw prime (unmodified) corn starch (Corn Products International, 3005) is added to the mixture and mixed to steady viscosity. Upon completion the temperature of the starch/silicate adhesive is 45° C. (113° F.).

Results

Initial Stein-Hall viscosity—35s @ 51° C. (124° F.)

gel temp.—71° C. (160° F.)

solids—35%

| Edge Crush of Production Board | | |
| --- | --- | --- |
| box type | starch adhesive | starch silicate example #2 |
| light weight | 27.5 lb/in | 37.9 lb/in |
| medium weight | 34.5 | 49.2 |
| heavy weight | 53 | 73.3 |

Example 3

The formula in Example 2 was used to prepare a lab sample to test greenbond strength (duplication of the bond strength immediately off the single facer) The lab prepared sample demonstrated significantly higher green bond strength.

control (example #1)—332 grams of force starch/silicate (example #3)—449 grams of force

Example 4

Preparation of silicate-starch adhesive demonstrating high temperature stability.

The carrier portion of the starch/silicate adhesive is prepared by combining 36.0 pbw water with 3.0 pbw modified corn starch (Corn Products International, Surebond®) followed by 1.0 pbw caustic (50%). The resulting slurry is held at 60° C. (140° F.) and is allowed to gel under high shear mixing. Upon reaching a stable viscosity, 20.0 pbw sodium silicate (Silicate N®, PQ Corporation) is added and mixed until homogeneous. 1.5 pbw caustic (50%) is added to the mixture and mixed until homogeneous. 0.37 pbw borax (pentahydrate)is added to the mixture. Upon reaching a stable viscosity 11.13 pbw water is added and mixed until homogeneous. 27.0 pbw prime (unmodified) corn starch (Corn Products International, 3005) is added to the mixture and mixed to steady viscosity.

Initial Stein-Hall Viscosity—23 seconds @ 45° C. (113° F.).

gel temperature—72.5° C. (162° F.)

solids content—39.1%

Viscosity Stability

|  | initial | 60 min @ 55° C. | 120 min @ 55° C. | 4 hrs @ 55° C. | 7 hrs @ 55° C. |
|---|---|---|---|---|---|
| example #1 | 50 s @ 40° C. | 118 s | 342 s | >10 min | NA |
| example #4 | 23 s @ 55° C. | 22 s | 22 s | 23 s | 22 s |

Example 5

A method of varying the gelation characteristic of silicate-starch adhesives by changing the quantities of caustic soda and borax used in their preparation. Adhesive was prepared using unmodified starch as the carrier.

The carrier portion of the starch/silicate adhesive is prepared by combining 39.2 pbw water with 3.7 pbw prime (unmodified) corn starch (Corn Products International, 3005) followed by 0.78 pbw caustic (50%). The resulting slurry is held at 45° C. (113° F.) and is allowed to gel under high shear mixing. Upon reaching a stable viscosity, 20.0 pbw sodium silicate (Silicate N®, PQ Corporation) is added and mixed until homogeneous. Caustic (50%) is added to the amount shown in the Table, and mixed until homogeneous, after which borax (pentahydrate)is added to the mixture as shown in the Table. Upon reaching a stable viscosity 12.2 pbw water is added and mixed until homogeneous. 23.7 pbw prime (unmodified) corn starch (Corn Products International, 3005) is added to the mixture and mixed to steady viscosity. Gelation characteristics are determined using a Brabender instrument.

BRABENDER RESULTS

|  | 2nd NaOH (pbw) | borax (pbw) | start of gel (minutes) | elapsed time to maximum viscosity (minutes) | brabender Visc. | gel slope |
|---|---|---|---|---|---|---|
| starch adhesive | 0 | 0.25 | 13.5 | 18.5 | 560 | 112 |
| starch/silicate | 0.875 | 0.25 | 14.5 | 22 | 550 | 73.3 |
| starch/silicate | 1.75 | 0.25 | 13.0 | 20 | 920 | 131.4 |
| starch/silicate | 1.75 | 0 | 14.0 | 21 | 660 | 94.3 |

Example 6

A process for preparing a stable adhesive composition having a very high solids content.

The carrier portion of the starch/silicate adhesive is prepared by combining 36.0 pbw water with 3.0 pbw modified corn starch (Corn Products International, Surebond®) followed by 1.00 pbw caustic (50%). The resulting slurry is held at 60° C. (140° F.) and is allowed to gel under high shear mixing. Upon reaching a stable viscosity, 22.0 pbw sodium silicate (Silicate N®, PQ Corporation) is added and mixed until homogeneous. 1.5 pbw caustic (50%) is added to the mixture and mixed until homogeneous. 0.40 pbw borax (pentahydrate)is added to the mixture. Upon reaching a stable viscosity 4.1 pbw water is added and mixed until homogeneous. 32.0 pbw prime (unmodified) corn starch (Corn Products International, 3005) is added to the mixture and mixed to steady viscosity.

initial Stein-Hall viscosity—39 seconds @45° C. (113° C.)] gel temp—73° C. (163° F.).
solids—44.9%

Example 7

Compatibility and effectiveness of silicate-starch compositions with water proofing resins.

The carrier portion of the starch/silicate adhesive is prepared by combining 36.1 pbw water with 4.3 pbw modified corn starch (Corn Products International, Surebond®) followed by 1.00 pbw caustic (50%). The resulting slurry is held at 55° C. and is allowed to gel under high shear mixing. Upon reaching a stable viscosity, 18.9 pbw sodium silicate (Silicate N®, PQ Corporation) is added and mixed until homogeneous. 1.4 pbw caustic (50%) is added to the mixture and mixed until homogeneous. 0.37 pbw borax (pentahydrate)is added to the mixture. Upon reaching a stable viscosity 15.83 pbw water is added and mixed until homogeneous. 22.1 pbw prime (unmodified) corn starch (Corn Products International, 3005) is added to the mixture and mixed to steady viscosity.

Two of the more common water proofing resins, a melamine-formaldehyde resin (Corn Products International, Coragum®) and a ketone-formaldehyde resin (Cellbond Inc., Watertite®) were post added to the prepared starch/silicate adhesive. As is the common practice in the corrugating industry, the post addition of resin is measured as a percentage of starch solids.

Starch/silicate showed no compatibility problems with either Coragum® or Watertite®. In the specific case of Coragum®, the viscosity was monitored for 24 hrs.

Stability of Starch/Silicate with 6% Coragum ® post added

|  | initial visc @ 45° C. | 24 hour visc @ 45° C. |
|---|---|---|
| starch/silicate | 24 s | 21 s |
| starch/silicate + melamine-formaldehyde resin | 30 s | 23 s* |

*sample was shear mixed for 1 minute

The water resistance of starch/silicate with resin was measure two ways:

Starch/silicate with 6% post added Coragum® was tested by gelling the adhesive samples, submersing the samples under water and then observing the rate of breakdown of the gelled samples. Results showed a much slower rate of gel breakdown of starch/silicate with Coragum®.
i. Starch/silicate with 5% post added Watertite® was tested using TAPPI T812 and passed with equal resistance over 24 hrs as that of the starch adhesive with 5% post added Watertite®.

Example 8

Starch/silicate adhesive prepared using the two-stage Stein-Hall method.

This method is conventionally used in preparing starch-only adhesives for making corrugated boxboard. We have found that it can readily be adapted to the making of starch-silicate adhesives according to the present invention by process steps such as the following:

The first stage is prepared by combining 13.31 pbw water with 3.63 pbw modified corn starch (Corn Products International, Surebond®) followed by 1.03 pbw caustic (50%). The resulting slurry is held at 57° C. (135° F.) and is allowed to gel under high shear mixing, after which 9.70 pbw water is mixed into the gel.

The second stage is prepared by combining 34.87 pbw water with 15.98 pbw sodium silicate (Silicate N®, PQ Corporation) followed by 0.73 pbw caustic (50%) and then 0.41 pbw borax (decahydrate)and finally 20.34 pbw prime (unmodified) corn starch (Corn Products International, 3005).

The first stage mix is dropped into the second stage mix over a 20 minute time period. The combined mixes are stirred to steady viscosity
initial Stein-Hall Viscosity—62s @34° C. (94° F.)
gel temperature—68° C. (154° F.)
solids content—31.2%
green bond strength—475 grams of force Example 9

The "No carrier" technique used in manufacturing starch adhesives is characterized by the fact that controlled swelling of all of the starch is determinative of the finished adhesive viscosity. As adapted to the preparation of starch-silicate adhesives according to the present invention, viscosity increase is terminated by the addition of a second portion of silicate.

The starch/silicate adhesive is prepared by combining 40.0 pbw water with 9.5 pbw sodium silicate (Silicate N®, PQ Corporation) followed by 2.5 pbw caustic (50%)and then 0.37 pbw borax (pentahydrate). To the resulting solution is added 25.0 pbw prime (unmodified) corn starch (Corn Products International, 3005) under agitation. Upon reaching a viscosity of ~7000 cps @ 35° C. (95° F.) the viscosity advancement is halted by the addition of 10.5 pbw sodium silicate (Silicate N®, PQ Corportation). 12.13 pbw water is added to further reduce viscosity.
Initial viscosity—21s @ 36° C. (97° F.)
18 hr viscosity (stored at 50° C. )—21s @ 45° C. (113° F.)
gel temperature—74° C. (165° F.)

Example 10

Silicate-starch adhesives prepared as a dry blend by the use of a solid form of alkali silicate.

Prior to making the adhesive mix, a dry blend is prepared by combining 72.29 pbw prime (unmodified) corn starch (Corn Products International, 3005) with 26.50 pbw sodium silicate powder (Silicate G®, PQ Corporation) and 1.21 borax (pentahydrate).

The carrier portion of the starch/silicate adhesive is prepared by combining 36.1 pbw water with 4.3 pbw modified corn starch (CPC surebond®) followed by 1.0 pbw caustic (50%). The resulting slurry is held at 55° C. (131° F.) and is allowed to gel under high shear mixing. Upon reaching a stable viscosity the gel is diluted with 26.22 pbw water. To the diluted gel is added 30.57 pbw of the previously prepared of starch/sodium silicate/borax dry mix. After thoroughly mixing until homogeneous, 1.81 pbw high alkaline sodium silicate (metso pentabead®, PQ Corportation) is added to the mixture and mixed to steady viscosity.
Initial Stein-Hall viscosity—35s at 45° C. (113° F.)
gel temperature—73° C. (163° F.)
pH—11.2
solids—37.2%

Example 11

Preparation of silicate-starch adhesives using recycled water from corrugator print station. ie. "flexo" water.

The carrier portion of the starch/silicate adhesive is prepared by combining 36.1 pbw "flexo" water with 4.3 pbw modified corn starch (CPC surebond®) followed by 1.0 pbw caustic (50%). The resulting slurry is held at 55° C. and is allowed to gel under high shear mixing. Upon reaching a stable viscosity, 18.9 pbw sodium silicate (Silicate N®, PQ Corporation) is added and mixed until homogeneous. 1.4 pbw caustic (50%) is added to the mixture and mixed until homogeneous. 0.37 pbw borax (pentahydrate)is added to the mixture. Upon reaching a stable viscosity 15.83 pbw flexo water is added and mixed until homogeneous. 22.1 pbw prime (unmodified) corn starch (CPC 3005) is added to the mixture and mixed to steady viscosity.
Initial Stein-Hall Viscosity—24 seconds @ 45° C. (113° F.)
24 hour viscosity at 120F—29 seconds @ 45° C. (113° F.)
gel temperature—72° C. (162° F.)
pH—11.2
solids—35.1%

This results in a composition containing lower levels of soluble copper as measured by atomic absorption spectrometry.

Starch/silicate—31 ppm measurable copper
"flexo" water*—56 ppm measurable copper

What is claimed is:

1. A process for preparing an adhesive composition, comprising the steps of:
    (a) preparing a gelled carrier portion, by adding from 1.5 to 10% by weight of a starch, based on the weight of said adhesive composition, to 20 to 40% by weight of water, mixing to disperse the starch in the water, then adding from 0.25 to 2.5% by weight of NaOH or KOH and mixing to constant viscosity to produce the gelled carrier portion;
    (b) adding to said gelled carrier portion from 10 to 30% by weight of a water-soluble alkali metal silicate characterized by a molar ratio $SiO_2:M_2O$ in the range from 1.5 to 4.0, where M is Na or K, then mixing the whole until substantially homogeneous;
    (c) adding a further 3 to 20% by weight of water and mixing until homogeneous; and
    (d) adding a further 2 to 25% by weight of starch and mixing until viscosity is substantially constant to produce a final adhesive composition having a solids content between 31.2% and 45% by weight.

2. A process according to claim 1, comprising the additional step, subsequent to step (b) and before step (c), of adding further NaOH or KOH up to 2.5% by weight and mixing to homogeneity.

3. A process according to claim 1, comprising the additional step, subsequent to step (b) and before step (c), of adding up to 2% by weight of borax and mixing to homogeneity.

4. A process according to claim 1, comprising the additional steps, subsequent to (b) and before step (c), of adding further NaOH or KOH up to 2.5% by weight, mixing to homogeneity, then adding up to 2% by weight of borax and again mixing to homogeneity.

5. A process according to claim 4, wherein said starch is selected from the group consisting of corn starch, wheat starch, potato starch and modified starches.

6. A process according to claim 5, wherein said starch is corn starch.

7. A process according to claim 5, wherein said starch is SUREBOND (trade-mark) modified corn starch (Corn Products International).

8. A process according to claim 4, wherein said alkali metal silicate is sodium silicate exhibiting a weight ratio of $SiO_2:Na_2O$ of about 3.2.

9. A process for preparing an adhesive composition, comprising the steps of:
(a) preparing a gelled carrier portion by adding from 1.5 to 10% by weight of a starch, based on the weight of said adhesive composition, to 20 to 40% by weight of water, mixing to disperse the starch in the water, then adding from 0.25 to 2.5% by weight of NaOH or KOH and mixing to constant viscosity; and
(b) adding to said gelled carrier portion about 30% by weight of a dry-blended mixture comprising about 72 parts by weight of corn starch, about 26 parts by weight of water-soluble sodium silicate powder and the balance borax pentahydrate powder, then shear mixing the dry-blended mixture into said gelled carrier portion until a steady viscosity is reached, to produce a final adhesive composition having a solids content between 31.2% and 45% by weight.

10. A process for preparing an adhesive composition, comprising the steps of:
(a) preparing a solution containing 35 to 55% by weight of water, based on the weight of said adhesive composition, with 7.5 to 12.5% by weight of sodium silicate and subsequently adding from 1 to 2% by weight of sodium hydroxide or potassium hydroxide, then adding up to 2% by weight of borax;
(b) adding to the solution produced in step (a) from 20 to 30% by weight of starch under agitation and monitoring the increasing viscosity;
(c) adding between 8 to 15% by weight of sodium silicate to terminate the increase in viscosity; and
(d) adding up to 15% by weight of water to adjust the final viscosity to between 20 and 60 Stein-Hall seconds and the solids content of the adhesive composition to a level between 31.2% and 45% by weight.

11. An improved adhesive composition for cellulosic materials, having a solids content of between 31.2 and 45 percent and consisting essentially of:
(i) 12 to 35% by weight of a starch;
(ii) 1.5 to 12% by weight of a soluble alkali metal silicate;
(iii) 0.25 to 2.5% by weight of an alkali hydroxide;
(iv) from 55 to 70% by weight water.

12. An adhesive composition according to claim 10, further comprising up to 2% of borax or boric acid.

13. An adhesive composition according to claim 11, wherein said starch is corn starch.

14. An adhesive composition according to claim 11, wherein said silicate is sodium silicate.

* * * * *